March 8, 1932. W. R. PEELER ET AL 1,848,651
COMBINED GARDEN AND LAWN IMPLEMENT
Filed April 20, 1931
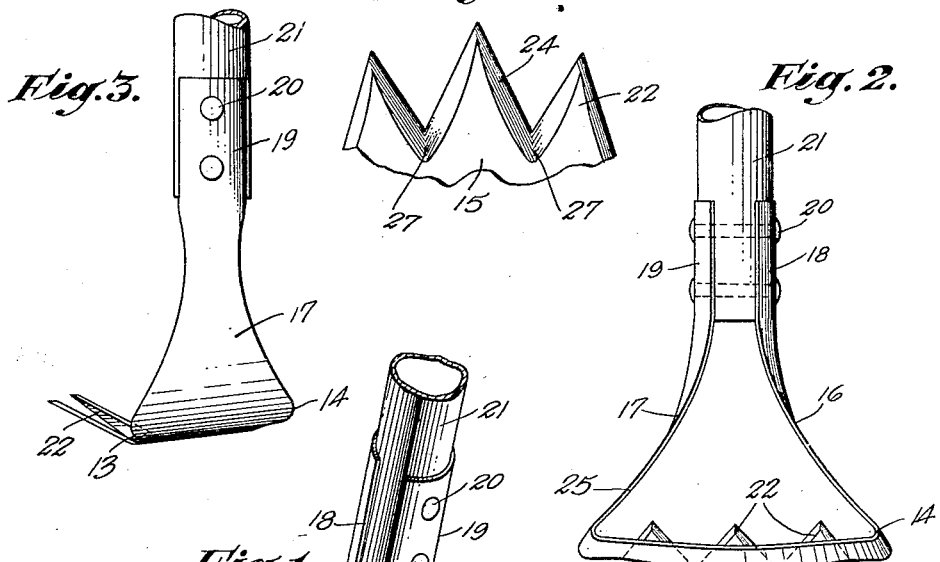
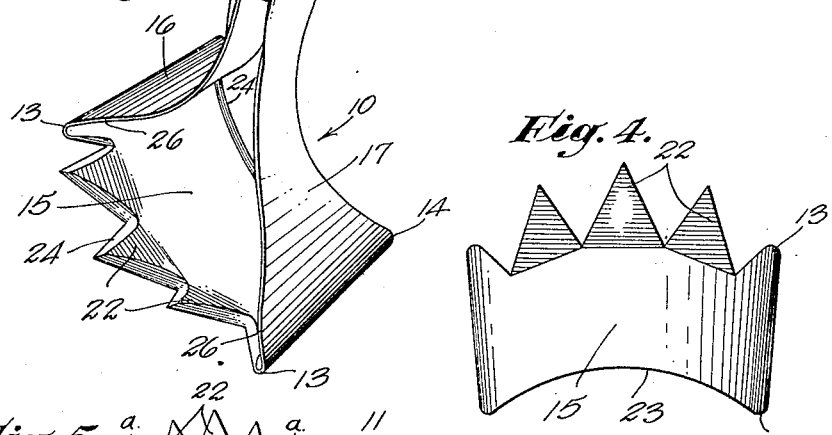
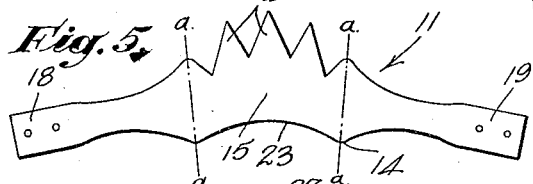
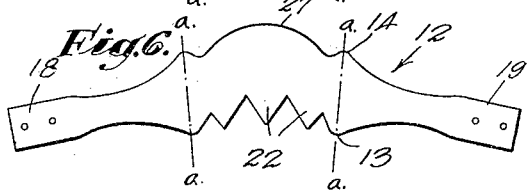
INVENTORS:
WILLIAM R. PEELER,
PHOEBE PEELER,
BY
ATTORNEY.

Patented Mar. 8, 1932

1,848,651

UNITED STATES PATENT OFFICE

WILLIAM R. PEELER AND PHOEBE PEELER, OF ELSINORE, CALIFORNIA

COMBINED GARDEN AND LAWN IMPLEMENT

Application filed April 20, 1931. Serial No. 531,408.

Our invention relates to a combined agricultural and lawn implement adapted for garden and field use for the purpose of chopping out weeds, thinning out plants, cultivating the soil around plants, and trimming the edges of lawns.

Our invention has for its principal object to provide a device of this character adapted for manual actuation when held in one position to effect a series of soil cultivating operations and which when reversed is adapted for plant and weed removing operations.

The nature of our invention consists in the peculiar construction of a cutting head adapting it to manufacture and sale as a new article of manufacture, and which may be pressed out as a unit from sheet metal.

A further object of our invention is to provide an agricultural implement which shall possess superior advantages in point of simplicity, durability, and general efficiency; and with these ends in view our invention consists in the improved construction, arrangement, and combination of parts, which will be later fully described, and particularly pointed out in the appended claims.

Still further objects and advantages of our invention will be made evident hereinafter.

Referring to the accompanying drawings, in which we have illustrated in detail a preferred embodiment of our invention:

Fig. 1 is a perspective view of our improved implement.

Fig. 2 is a rear elevational view.

Fig. 3 is a side elevational view.

Fig. 4 is a bottom plan view.

Fig. 5 is a plan view of one form of blank of the cutting head produced by a pressing or stamping operation.

Fig. 6 is an alternate form of blank.

Fig. 7 is an enlarged fragmental view of the chopping edge of the implement.

Corresponding parts in the several figures are indicated by similar numerals of reference.

Our improved implement comprises in its construction a head, a handle to which the head is connected, and cutting edges or elements of different characteristics formed on the head.

The head 10 is composed of a single strip of suitable material such as steel and is preferably formed by a pressing or stamping operation which produces blanks 11 and 12 of the character illustrated in Figs. 5 and 6, these blanks being thereafter shaped and finished to form the cutting head per se. This strip, which may be of any suitable dimensions, according to the use to which our improved implement is to be put, is bent along the lines $a$—$a$ indicated in Fig. 5, so as to form rounded corners 13 and 14, and the metal between the lines $a$—$a$ is bent outwardly to form a curved base or blade portion 15, the bent sides 16 and 17 being made to converge in the direction of each other, their upper ends 18 and 19 being bent to lie in planes parallel to each other. The ends 18 and 19 are provided with aligning perforations for the reception of rivets or screws 20 by means of which the cutting head is attached to a handle 21.

The forward part of the base or blade portion 15 is provided with teeth 22 which resemble in form the teeth of a mower blade, the teeth of the preferred form as illustrated in Fig. 4 diminishing in length from the center tooth in both directions towards the corners 13. Resultant of the curvature of the base portion 15, the teeth occupy a similar arcuate plane.

The rear part of the base or blade portion 15 is inwardly curved to provide a cutting edge 23 which is preferably beveled as at 24, such cutting edge 23 being continued around the corners 14 and upwardly to form cutting edges 25 along the lower edges of the bent sides 16 and 17. Likewise, the teeth 22 may be beveled, and cutting edges 26 are continued around the beveled corners 13 and upwardly along the lower edges of the bent sides 16 and 17.

In the modification illustrated in Fig. 6, the relative positions of the cutting edges are reversed, the teeth 22 increasing in length from the central tooth towards the corners 13, while the opposite cutting edge 27 is curved outwardly from the corners 14.

In Fig. 7 a section of the toothed portion of the blade is illustrated to show the bevel 24, which may be ground on the extremities of the teeth 22. In producing an edge of this character, the bevel is continued by grinding around all of the teeth and also the portions 27 of the base 15 contiguous to the beveled edges of the teeth. In this manner a sharp cutting edge is produced on the edges of the teeth.

The teeth 22 are normally disposed at a slight upward angle relative to the base 15, as illustrated in Fig. 4, which gives the teeth the proper pitch for cutting tall and heavy weeds, variations in pitch being produced by bending the teeth with a proper tool to dispose the same at different angles to the base.

For the operation of removing weeds, the handle 21 is held in the hands of the operator with the toothed edge of the cutting head disposed outwardly. The implement is then elevated to a position beyond the operator and then brought downwardly against the lower part of the weeds, producing a chopping movement which severs the same at a point immediately above the surface of the ground.

Should it be desired to remove individual weeds, such as dandelions, etc., either of the curved corners 13 or 14 of the cutting head may be pushed into the ground around the stalk of the weed and a slight twist of the handle will drive the curved corner into the earth and remove the weed.

For hoeing operations, the cutting edges 23 or 27 are used in the manner of the ordinary hoe, and likewise for earth chopping operations.

Lawn edges may be trimmed by bringing the rounded cutting edges 13 or 14 of the implement into engagement with the edges of the lawn and that of the walk.

While the embodiment of our invention illustrated by the drawings has been described with considerable particularity, it is to be expressly understood that the invention is not to be restricted thereto, as the same is capable of a variety of mechanical expressions, some of which will readily suggest themselves to those skilled in the art, while certain features thereof are capable of use without other features thereof. Reference is therefore to be had to the appended claims for a definition of the limits of our invention.

We claim as our invention:

1. An agricultural implement comprising a handle and a working member attached thereto, said working member consisting of a loop of sheet metal narrow in proportion to its length, said working member comprising a forward blade portion and arms converging from the ends of the blade portion to the handle, said blade portion being bent rearwardly and inwardly on a curve at the ends to form rounded corners and widened at the corners to provide internally concave cutting projections at said corners.

2. An agricultural implement comprising a handle and a working member attached thereto, said working member consisting of a loop of sheet metal narrow in proportion to its length, said working member comprising a forward blade portion and arms converging from the ends of the blade portion to the handle, said blade portion being bent rearwardly and inwardly on a curve at the ends to form rounded corners and widened at the corners to provide internally concave cutting projections at said corners, said blade being alternately widened and narrowed between said corners to provide projecting cutting teeth.

3. An agricultural implement comprising a handle and a working member attached thereto, said working member consisting of a loop of sheet metal narrow in proportion to its length, said working member comprising a forward blade portion and arms converging from the ends of the blade portion to the handle, said blade portion being bent rearwardly and inwardly on a curve at the ends to form rounded corners and widened at the corners, said arms merging into the rearwardly bent ends of the blade and being disposed at acute angles to the body of the blade, said blade being widened at the corners to provide internally concave cutting projections at said corners.

4. An agricultural implement comprising a handle and a working member attached thereto, said working member consisting of a loop of sheet metal narrow in proportion to its length, said working member comprising a forward blade portion and arms converging from the ends of the blade portion to the handle, said blade portion being bent rearwardly and inwardly on a curve at the ends to form rounded corners and widened at the corners, said arms merging into the rearwardly bent ends of the blade and being disposed at acute angles to the body of the blade, said blade being widened at the corners to provide internally concave cutting projections at said corners, one edge of said blade being formed on a substantially continuous curve between the rounded corners.

In testimony whereof, we have hereunto set our hands at Elsinore, California, this 11th day of April, 1931.

WILLIAM R. PEELER.
PHOEBE PEELER.